US009928309B2

(12) United States Patent
Pugsley et al.

(10) Patent No.: US 9,928,309 B2
(45) Date of Patent: Mar. 27, 2018

(54) HANDLING CONTENT ASSOCIATED WITH CONTENT IDENTIFIERS

(75) Inventors: Craig Pugsley, Devon (GB); Jonathan Davies, Bristol (GB)

(73) Assignee: Nokia Technologies Oy, Espoo (FI)

( * ) Notice: Subject to any disclaimer, the term of this patent is extended or adjusted under 35 U.S.C. 154(b) by 673 days.

(21) Appl. No.: 12/824,617

(22) Filed: Jun. 28, 2010

(65) Prior Publication Data

US 2011/0320746 A1 Dec. 29, 2011

(51) Int. Cl.
G06F 3/16 (2006.01)
G06F 3/048 (2013.01)
G06F 17/30 (2006.01)

(52) U.S. Cl.
CPC .. *G06F 17/30946* (2013.01); *G06F 17/30144* (2013.01); *G06F 17/30174* (2013.01); *G06F 17/30772* (2013.01); *G06F 3/048* (2013.01); *G06F 3/16* (2013.01)

(58) Field of Classification Search
CPC . G06F 3/00; G06F 3/048; G06F 3/033; G06F 3/14; G06F 3/16
USPC .................................................. 715/860, 748
See application file for complete search history.

(56) References Cited

U.S. PATENT DOCUMENTS

| 7,149,959 | B1 * | 12/2006 | Jones et al. ................... 715/234 |
| 7,409,644 | B2 * | 8/2008 | Moore et al. ................. 715/774 |
| 8,108,430 | B2 * | 1/2012 | Wong et al. ................... 707/792 |
| 2002/0154177 | A1 | 10/2002 | Barksdale et al. |
| 2003/0001895 | A1 * | 1/2003 | Celik ............................ 345/769 |
| 2004/0093568 | A1 * | 5/2004 | Lerner et al. ................. 715/541 |
| 2005/0216855 | A1 | 9/2005 | Kopra et al. |
| 2007/0043700 | A1 * | 2/2007 | Dawson et al. .................. 707/3 |
| 2007/0048712 | A1 | 3/2007 | Plastina et al. |
| 2007/0106942 | A1 * | 5/2007 | Sanaka et al. ................ 715/733 |
| 2007/0124781 | A1 | 5/2007 | Casey et al. |
| 2007/0174888 | A1 * | 7/2007 | Rubinstein .................... 725/115 |
| 2008/0040760 | A1 * | 2/2008 | Cho et al. ........................ 725/87 |
| 2008/0147668 | A1 * | 6/2008 | Weetman .......... G06F 17/30067 |
| 2008/0201446 | A1 | 8/2008 | Svendsen |

(Continued)

FOREIGN PATENT DOCUMENTS

EP 1 337 113 A 8/2003
WO WO 02/50787 A1 6/2002

OTHER PUBLICATIONS

Office Action with Extended Search Report for European Application No. 11 800 271.6 dated Mar. 10, 2017.

(Continued)

*Primary Examiner* — Doon Chow
*Assistant Examiner* — Le Nguyen
(74) *Attorney, Agent, or Firm* — Alston & Bird LLP

(57) ABSTRACT

A method, apparatus, and computer program product are provided for managing content on at least two devices. An interface provides a listing of content, such as multimedia files, stored on devices such as a personal computer and/or mobile device. Indicators associated with a content item indicate whether or not associated content is stored on the respective devices. Selection of an indicator may result in copying of files from one device to another, deletion of a media file from a respective device, and/or downloading a file from a location remote from either or both devices to a respective device. Indicators may be updated to reflect the completion of copying, deletion, and/or downloading.

20 Claims, 9 Drawing Sheets

(56) References Cited

U.S. PATENT DOCUMENTS

| | | |
|---|---|---|
| 2009/0063975 A1* | 3/2009 | Bull et al. .................. 715/716 |
| 2009/0254951 A1 | 10/2009 | Lee et al. |
| 2010/0063967 A1* | 3/2010 | Anderson et al. ............ 707/728 |
| 2010/0070385 A1* | 3/2010 | Wassingbo et al. ............ 705/27 |
| 2010/0107078 A1* | 4/2010 | Hayashi ..................... 715/716 |
| 2010/0198944 A1* | 8/2010 | Ho et al. ..................... 709/217 |
| 2011/0113051 A1* | 5/2011 | Lindahl et al. ............... 707/758 |

OTHER PUBLICATIONS

International Search Report and Written Opinion for Application No. PCT/IB2011/052745 dated Jan. 12, 2012.

* cited by examiner

HANDLING CONTENT ASSOCIATED WITH CONTENT IDENTIFIERS

FIELD OF THE INVENTION

This invention relates generally to handling content associated with content identifiers.

BACKGROUND TO THE INVENTION

It is now common for mobile devices to store content and software applications, such as images, videos, music and other audio files, games and documents. A user of a mobile device commonly will be able to store their multimedia files on a personal computer as well as on a mobile device and to transfer files between the device and computer. A user may also be able to download multimedia from an external source to their mobile device, computer or both.

SUMMARY OF THE INVENTION

A first aspect of the invention provides a method comprising:
  displaying a content identifier associated with content;
  displaying a first indicator and a second indicator in association with the content identifier;
  indicating through the first indicator whether or not some or all of the content is stored in a first memory;
  indicating through the second indicator whether or not some or all of the content is stored in a second memory; and
  responding to selection of the first indicator, when the first indicator indicates that none of the content is stored in the first memory and the second indicator indicates that some or all of the content is stored in the second memory, by causing the copying of content associated with the first content identifier from the second memory into the first memory.

A second aspect of the invention provides apparatus configured:
  to cause a content identifier associated with content to be displayed;
  to cause a first indicator and a second indicator to be displayed in association with the content identifier;
  to cause the first indicator to indicate whether or not the some or all of the content is stored in a first memory;
  to cause the second indicator to indicate whether or not some or all of the content is stored in a second memory; and
  to be responsive, when the first indicator indicates that none of the content is stored in the first memory and the second indicator indicates that some or all of the content is stored in the second memory, to selection of the first indicator to cause the content associated with the first content identifier to be copied from the second memory into the first memory.

A third aspect of the invention provides a non-transitory computer-readable storage medium having stored thereon computer-readable code, which, when executed by computing apparatus, causes the computing apparatus;
  to cause a content identifier associated with content to be displayed;
  to cause a first indicator and a second indicator to be displayed in association with the content identifier;
  to cause the first indicator to indicate whether or not the some or all of the content is stored in a first memory;
  to cause the second indicator to indicate whether or not some or all of the content is stored in a second memory; and
  to be responsive, when the first indicator indicates that none of the content is stored in the first memory and the second indicator indicates that some or all of the content is stored in the second memory, to selection of the first indicator to cause the content associated with the first content identifier to be copied from the second memory into the first memory.

The computer-readable code, when executed by computing apparatus, may also cause the computing apparatus to be responsive to completion of copying the content associated with the first content identifier from the second memory into the first memory to change the status of the first indicator to indicate that some or all of the content is stored in the first memory.

The computer-readable code, when executed by computing apparatus, may also cause the computing apparatus;
  to be further responsive, when the first indicator indicates that some or all of the content items are stored in the first memory, to selection of the first indicator:
  to cause the content associated with the first content identifier to be deleted from the first memory; and
  to change the status of the first indicator to indicate that none of the content is stored in the first memory.

The computer-readable code, when executed by computing apparatus, may also cause the computing apparatus;
  to be further responsive, when the first indicator indicates that none of the content is stored in the first memory and the second indicator indicates that none of the content is stored in the second memory, to selection of the first indicator;
  to cause content associated with the first content identifier to be downloaded into the first memory from an external source; and
  to change the status of the first indicator to indicate that some or all of the content is stored in the first memory.

The computer-readable code, when executed by computing apparatus, may also cause the computing apparatus to cause the first indicator to indicate a transition state when content is being copied into or deleted from the first memory; and to cause the first indicator not to be selectable while indicating the transition state.

The computer-readable code, when executed by computing apparatus, may also cause the computing apparatus, when the content identifier relates to plural content items, when only some of the plural content items are stored in the second memory and when the first indicator indicates that none of the content is stored in the first memory, to be responsive to selection of the first indicator, to copy the content items that exist in the second memory to the first memory.

The computer-readable code, when executed by computing apparatus, may also cause the computing apparatus, when the content identifier relates to plural content items and when only some of the plural content items are stored in the first or second memory, to cause the respective first or second indicator to indicate an intermediate state.

A fourth aspect of the invention provides apparatus having at least one processor and at least one memory having computer-readable code stored thereon which when executed controls the at least one processor:
  to cause a content identifier associated with content to be displayed;
  to cause a first indicator and a second indicator to be displayed in association with the content identifier;

to cause the first indicator to indicate whether or not the some or all of the content is stored in a first memory;

to cause the second indicator to indicate whether or not some or all of the content is stored in a second memory; and to be responsive, when the first indicator indicates that none of the content is stored in the first memory and the second indicator indicates that some or all of the content is stored in the second memory, to selection of the first indicator to cause the content associated with the first content identifier to be copied from the second memory into the first memory.

A fifth aspect of the invention provides apparatus comprising:

means for causing a content identifier associated with content to be displayed;

means for causing a first indicator and a second indicator to be displayed in association with the content identifier;

means for causing the first indicator to indicate whether or not the some or all of the content is stored in a first memory;

means for causing the second indicator to indicate whether or not some or all of the content is stored in a second memory; and means responsive, when the first indicator indicates that none of the content is stored in the first memory and the second indicator indicates that some or all of the content is stored in the second memory, to selection of the first indicator for causing the content associated with the first content identifier to be copied from the second memory into the first memory.

A sixth aspect of the invention provides a computer program that when executed by computer apparatus controls it to perform a method according to a first aspect of the invention.

BRIEF DESCRIPTION OF THE DRAWINGS

Embodiments of the present invention will now be described, by way of example only, with reference to the accompanying drawings, in which.

DETAILED DESCRIPTION OF PREFERRED EMBODIMENTS

Figure 1:
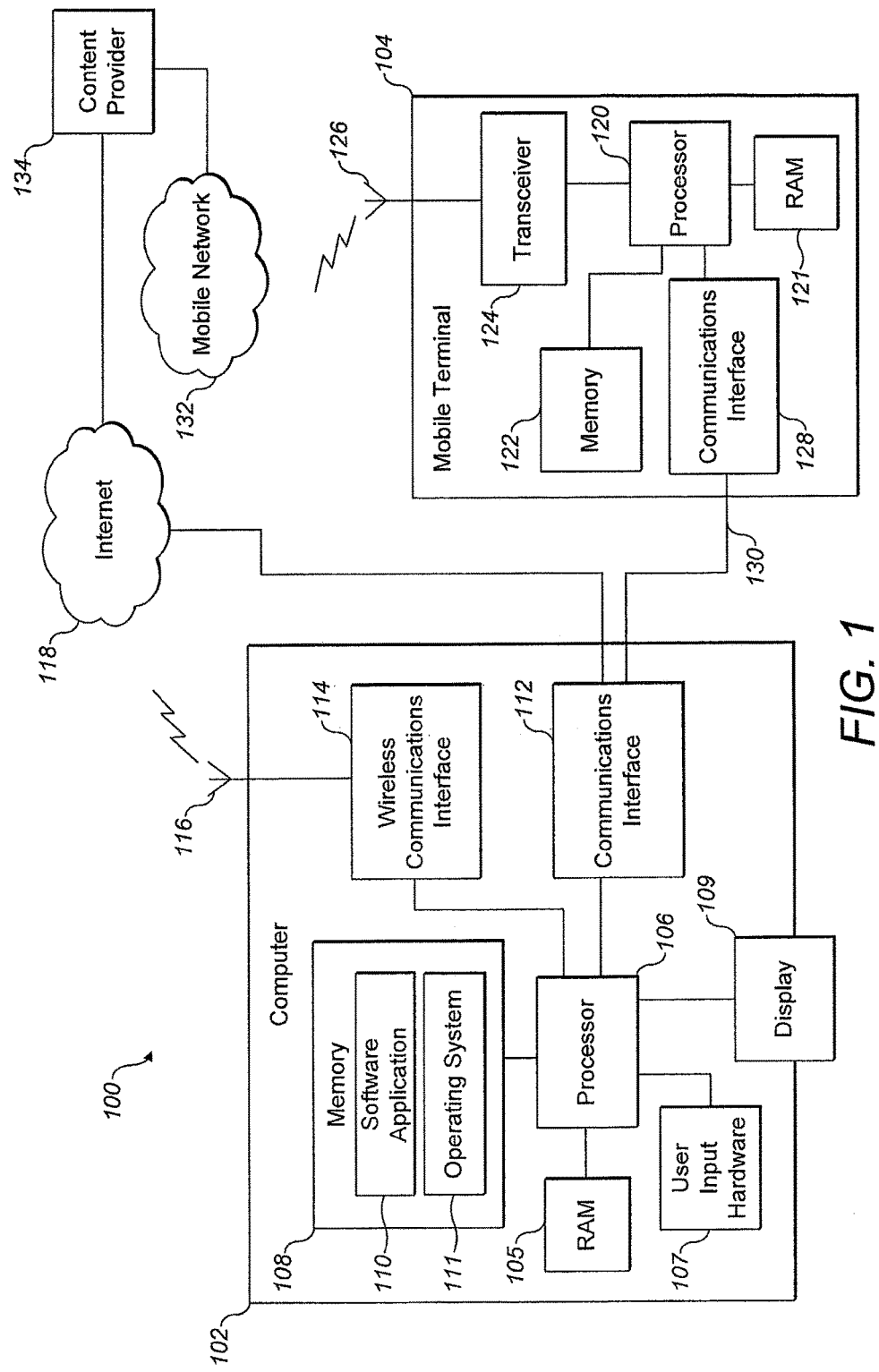
FIG. 1 is a schematic diagram illustrating components of a system embodying aspects of the invention.

Referring firstly to FIG. 1, a system 100 is shown. The system 100 comprises a computer 102 and a mobile terminal or device 104. The computer may be a laptop, netbook or desktop computer, for instance. It may run an operating system such as Mac OSX, Windows 7, or a Linux operating system such as Ubuntu. The computer 102 has a processor 106, user input hardware 107, a memory 108 and a display 109. The processor 106 is connected to and controls operation of the other components of the computer 102. The user input hardware 107 may take any suitable form, for example a combination of a keyboard, mouse, trackball and microphone. The memory 108 is a non-volatile memory such as a magnetic hard disk drive or a solid state drive (SSD). The display 109 may be integrated with the computer 102, such as with a laptop, or may be a separate device connected to the computer 102. The display 109 may also comprise a touch screen display such that the processor 106 can receive user inputs from the display 109. The memory 108 stores a software application 110 and an operating system 111. It also stores software modules and files needed to operate the computer 102 as well as content, for instance content items in the form of files such as music and video files. The processor 106 may access a volatile memory such as a RAM 105 in order to execute the operating system and application software to control operation of the computer 102 and other components.

The computer 102 also has a communication interface 112 for sending and receiving signals. The communication interface 112 may comprise any of a USB host controller, a network interface card, PCI bus, SCSI bus or any other suitable connection interface. Although only one communication interface is shown for clarity, the computer 102 may have more than one communication interface 112 as the computer may be configured to communicate via several different protocols. The communication interface 112 allows for communication with the mobile terminal 104 and also communication with external sources via the internet 118.

The computer 102 also has a wireless communication interface 114 which may be a wireless network interface card. The wireless communication interface 114 is connected to an antenna 116 for sending and receiving wireless signals. The antenna 116 may be internal to the computer 102. Only one wireless communication interface 114 and antenna 116 are shown for clarity; however the computer 102 may have several wireless communication interfaces.

The mobile terminal 104 comprises a processor 120, a memory 122 and may comprise a transceiver 124. The mobile also has RAM 121 which is accessed by the processor 120 in order to execute the operating system and application software to control operation of the other components in the mobile terminal 104. The transceiver 124 is connected to an antenna 126 for sending and receiving wireless signals. The antenna 126 may be internal to the mobile terminal 104. The processor 120 is connected to and controls operation of the other components in the mobile terminal 104. The memory 122 may store a mobile terminal operating system (not shown) as well as application software and content files such as music, images and videos (not shown). The mobile terminal 104 also has a communications interface 128. Computer programs and software modules are executed or run by the processor 120 using the RAM 121 and the memory 122.

The mobile terminal communications interface 128 is able to exchange data with the computer communications interface 112 via a link 130. The link 130 may be a wired link using any protocol compatible with the communications interfaces 112, 128. The mobile terminal 104 and the computer 102 may also exchange data via a wireless network (not shown) using the wireless communications interface 114, transceiver 124 and their respective antennas 116, 126. The wireless network may be a wireless PAN, piconet or LAN and may be provided by a router. The wireless network may also provide access to the internet.

The system may comprise a mobile network 132 such as a cellular network. The system may also comprise one or more remote content providers 134. A remote content provider 134 may be accessed by the computer 102 via the internet 118, or by the mobile terminal via the mobile network 132. The content provider 134 may be a website which hosts content as content items available for download or for streaming. The content provider 134 may be distributed. The content provider 134 may be a cloud system. The content provider 134 may for example be the Ovi™ store provided by Nokia Corporation. The computer 102 and the mobile terminal 104 may each use a browser program stored in their respective memories to navigate to the website of the content provided 134 in order to view content available for download or streaming. Although the computer 102 is shown as having a wired link to the internet 118, the computer may also access the internet using a wireless link, possibly via a wireless LAN provided by a router (not shown).

Under control of the operating system 111 and the software application 110, the processor 106 may read the contents of the memory 108 or read an index of some or all of the contents of the memory 108. The processor 106 may also be controlled to generate and send messages via the communications interface 112 or wireless communications interface 114. The processor 106 may, for example, send messages to the processor 120 of the mobile terminal 104 requesting an index of the contents of the memory 122 of the mobile terminal 104. The processor may also be controlled to delete content stored in the memory 108 or to send a message to mobile terminal processor 120 instructing that files in the mobile terminal memory 122 should be deleted.

Content may be exchanged between the computer 102, mobile terminal 104 and remote content provider 134. For example, the software application 110 may control the processor 106 to send content from the computer memory 108 to the mobile terminal memory 122, or to request the transfer of content from the mobile terminal memory 122 to the computer memory 108. Additionally the computer processor 106 may request the transfer of content from a remote content provider 134 to either the computer memory 108 or mobile terminal memory 122.

The software application 110 is a program for managing, viewing and using content such as music, images, videos, applications, contacts and messages. The software application 110 may be the Ovi™ suite, provided by Nokia Corporation. The software application 110 provides a graphical user interface which is displayed on display 109.

In operation, the software application 110, in conjunction with the operating system 111 may control the computer processor 106. The computer memory 108 stores content. The content is in the form of content items, for example music track files. Each of these content items has a content identifier such as a file name and metadata such as one or more groups to which it belongs. For example, a music track file may have metadata relating to an album to which the track belongs, as well as data relating to an artist to which the track is attributed. The software application 110 may be configured to cause the computer memory 108 to index the content identifiers and metadata as and when they are added to the memory 108. Alternatively, upon a request by the software program 110, the processor 106 may create an index or partial index of some or all of the content stored in the memory 108.

A user may use user input hardware 107 to cause the software application 110 to start, run, or be executed. Additionally, the software application may start automatically when a mobile terminal 104 is connected to the computer 102 via link 130 or via a wireless network (not shown) in a wireless communications session. The mobile terminal memory 122 similarly stores content items, for example music track files. Each of these content items has a content identifier such as a file name and metadata such as one or more groups to which it belongs.

When the software application 110 is run and it is detected that a mobile terminal 104 is connected, the computer processor may request an index or partial index of content stored in mobile terminal memory 122. For example, the computer processor 106 may only request an index of a certain type of file, for example audio files. Upon receiving this request, the mobile terminal processor 120 may retrieve a pre-established index of content from the memory 122 or it may create an index or partial index of some or all of the content stored in the memory 122. The mobile terminal processor 120 then sends this index or partial index to the computer 102.

During operation of the software application 110, a user may request that content that is not currently stored in the computer memory 108 be transferred into the computer memory. The processor 106 may then be controlled to consult the mobile terminal memory index for the required content. If the content is indicated as being stored in the mobile terminal memory 122, the processor may request a transfer of that content from the mobile terminal 104. The mobile terminal processor 120 responds to this request by sending the required content to the computer 102. If after consulting the mobile terminal memory index for the required content it is determined that the content is not stored in the mobile terminal memory 122, the processor 106 may begin a procedure to download the content from a remote content provider 134. This procedure may involve completing a log in procedure with a website hosted by the content provider and/or agreeing to payment in exchange for the content. For example, where the software application 110 is the Ovi™ suite, integrated into this software is the Ovi™ store. Once a user is logged into the Ovi™ store, which may occur automatically when the software application 110 is run, a request for content which is not stored in either the computer memory 108 or mobile terminal memory 122 may cause the user to be prompted to agree to a download from the Ovi™ store. If the user agrees any payment may be taken from the user's Ovi™ account.

A user may also request that content which is not currently stored in the mobile terminal memory 122 be transferred into the mobile terminal memory 122. The processor 106 may then be controlled to consult the computer memory index for the required content. If the content is indicated as being stored in the computer memory 108, the processor may begin a transfer of that content from the computer to the mobile terminal 104. The mobile terminal processor 120 may receive notification of this request for content and subsequent transfer and be configured to store the transferred content in mobile terminal memory 122. If after consulting the computer memory index for the required content, it is determined that the content is not stored in the computer memory 108, the processor 106 may begin a procedure to download the content from a remote content provider 134. This procedure may comprise determining whether the computer 102 or the mobile terminal 104 should download the content. It will usually be more convenient and quicker for the computer 102 to download the content and then to transfer the downloaded content to the mobile terminal 104 since the mobile network 132 used by the mobile terminal to exchange data will generally have a lower bit rate than the connection available to the computer. The computer 102 may non-transiently store the downloaded content in its own memory 108 or it may, having transferred the content to the mobile terminal 104, delete the content from the computer memory 108. The download procedure may be substantially the same as described above with respect to the Ovi™ suite and store.

Figure 2:
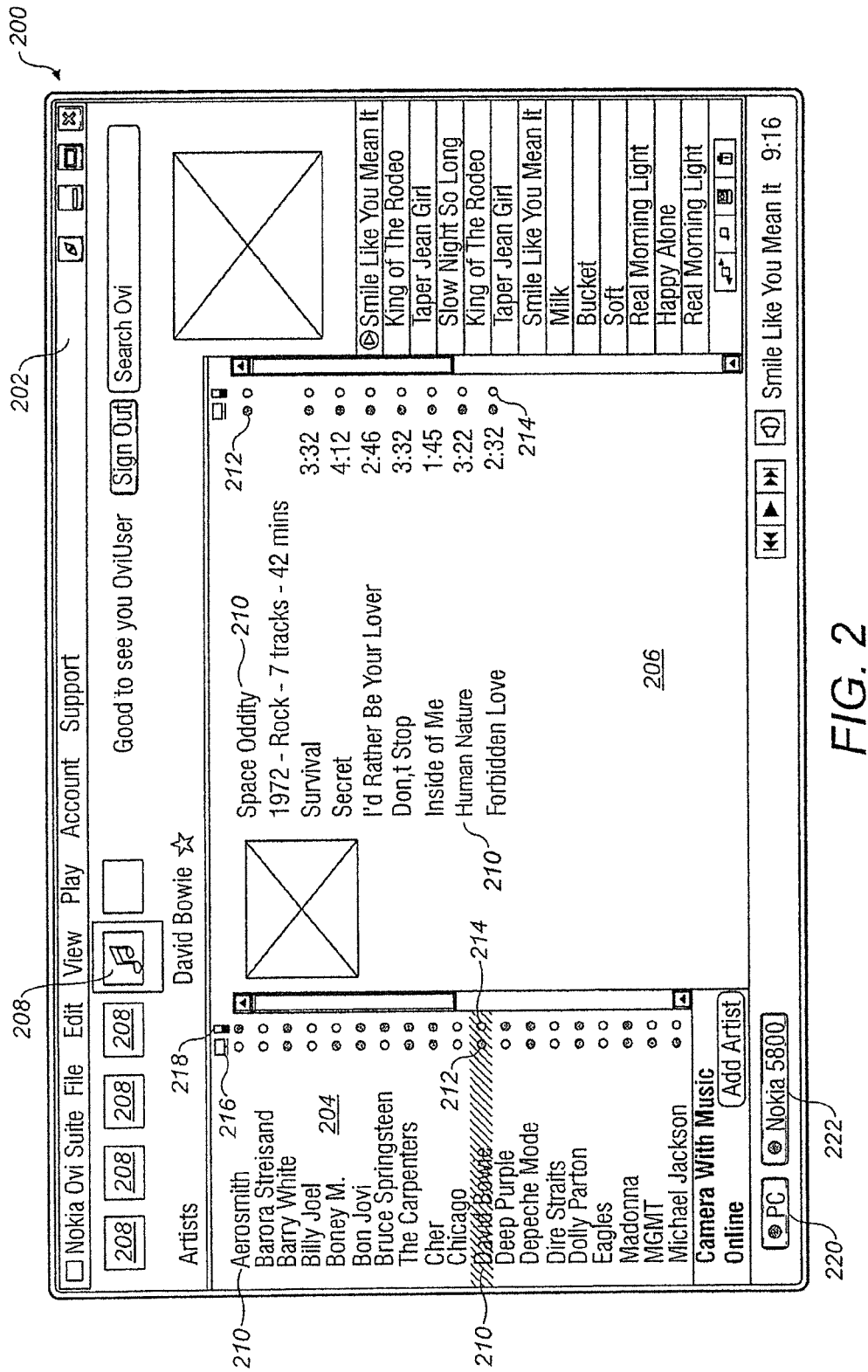
FIGS. 2 to 6 are screenshots of a user interface provided by the FIG. 1 system.

Embodiments depicting the operation of software application 110 will now be described with reference to FIGS. 2 to 6. FIG. 2 shows a first screenshot 200 provided by a software application user interface. The screenshot 200 of the user interface is displayed in a window 202. The window 202 has a left window area 204 and a central window area 206. Several content selection buttons 208 are positioned in a top part of window 202. The left window area 204 contains a list of content identifiers 210. Each content identifier 210 has displayed after it a first indicator 212 and a second indicator 214. At the top of the left window area 204 is a first memory symbol 216 under which the first indicators 212 are aligned and a second memory symbol 218 under which the second indicators 214 are aligned. The first memory symbol 216 depicts a computer to show that first indicators 212 relate to the computer memory 108. The second memory symbol 218 depicts a mobile device to show that second indicators 214 relate to a mobile device memory 122.

The central window area 206 shows a further list of content identifiers 210, each having associated therewith a first indicator 212 and a second indicator 214 aligned underneath a first memory symbol 216 and a second memory symbol 218 respectively. In a bottom part of window 202 a first memory connection button 220 and a second memory connection button 222 are provided. These memory connection buttons allow a user to choose whether or not content stored in the respectively memories is displayed.

The windows 202 shown in FIGS. 2 to 6 have the music content selection button 208 selected. The other content selection buttons 208 may represent, for example, images, videos, applications, contacts or messages.

In the embodiments depicted in FIGS. 2 to 6, music is displayed alphabetically by artist. The left window area 204 displays a list of content identifiers 210, each of which is an artist identifier. The central window area 206 displays albums and tracks by the selected artist. The first content identifier 210 in the central window area 206 is an album identifier. The other content identifiers 210 are individual tracks from that album. Artist identifiers in the left window area 204 may be selected and albums and tracks associated with that artist are displayed in central window area 206.

In FIG. 2 each first indicator 212 and second indicator 214 has one of two states. A positive state is shown as a black or filled in circle and indicates that the content associated with that content identifier 110 is stored in the respective memory. A negative state is shown as a white or unfilled circle and indicates that the content associated with that content identifier 110 is not stored in the respective memory. Although the first and second indicators are shown as black or white circles, the indicators may have any suitable form and appearance. For example the indicators may include a tick, cross or other symbol and may be of any colour, e.g. red for a negative status and green for a positive status.

In the left window area 204 of FIG. 2 the artist "David Bowie" is shown selected. The first indicator 212 associated with this artist shows a positive state indicating that at least one content item associated with this artist is stored in the computer's memory 108. The second indicator 214 associated with this artist shows a negative state indicating that none of the content associated with this artist is stored in the mobile terminal memory 122. The central window area 206 displays all of the albums and tracks associated with the artist David Bowie. In this example only one album exists.

The first content identifier, "Space Oddity" refers to an entire album. The remaining content identifiers 210 refer to the individual tracks of that album. For each of the content identifiers 210 in the central window area the first indicator 212 shows a positive status and the second indicator 214 shows a negative status indicating that every track on this album is stored in the computer's memory 108 and is not stored in the mobile terminal memory 122.

Left window area 204 also lists artists whose associated first and second indicators 212, 214 both show a negative status. Music by these artists is available for a user to stream from a remote content provider 134 via the internet 118. The user may select these remotely available artists in the left window area 204 and listen to available music tracks without downloading any content to the computer or mobile terminal memories.

Figure 3:
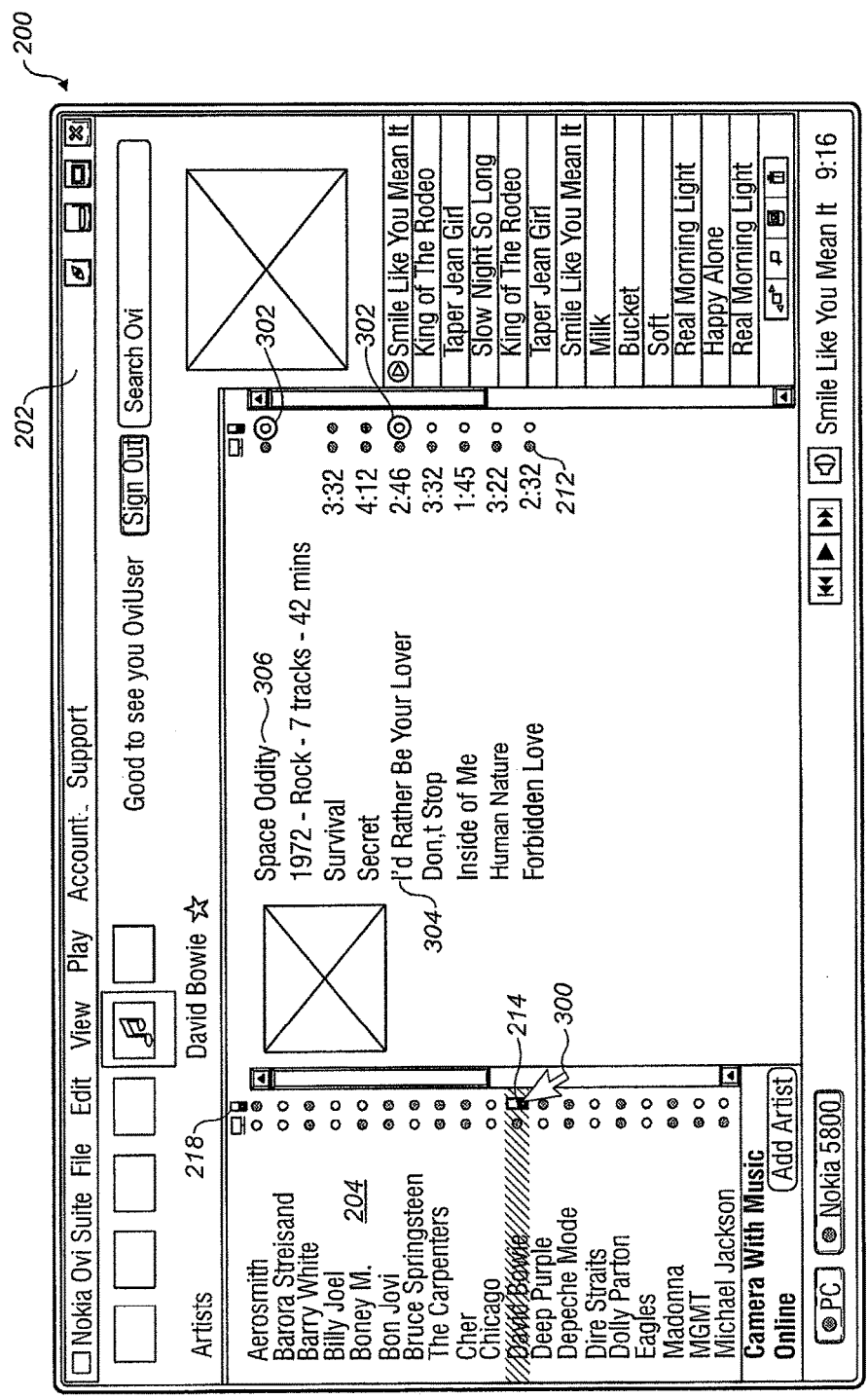

FIG. 3 shows a second screenshot 200 of the user interface similar to that of FIG. 2. A user controlled cursor 300 is shown positioned over a second indicator 214 of a selected artist. When the cursor 300 is positioned over the second indicator but without selection of the indicator (e.g. mouseover), the second indicator changes its appearance into that of the second memory symbol 218. This change allows the user to see easily which indicator (i.e. first or second) the cursor 300 is currently positioned over. The cursor 300 may be controlled by any user input hardware 107, for example a mouse. When the user selects the second indicator 214 with the cursor 300 a transfer of content into the mobile terminal memory 122 begins. If a user selects a second indicator 214 associated with an artist in the left window area 204 while the indicator is indicating a negative status, then all of the available content items associated with that artist are transferred to the mobile terminal memory 108.

As well as showing a positive or a negative state, the indicators 212, 214 may also show a transition state. Transition state indicators 302 are shown when content associated with a content identifier 210 is being transferred (either into or out of the memory). The first and second indicators 212, 214 change from a negative or positive state into a transition state indicator 302 when the transfer or deletion of content associated with that indicator starts, and stay in that state whilst the transfer is occurring. A transition state indicator is temporary and changes into a negative or positive state after the transfer. A music track indicator 304, representing a music track file which is currently being transferred into the mobile terminal memory 108, has a second indicator 214 in a transition state. An album content identifier 306, representing all of the music track files associated with that album, also has a second indicator 214 in a transition state because a track 304 associated with the album is currently being transferred.

Figure 4:
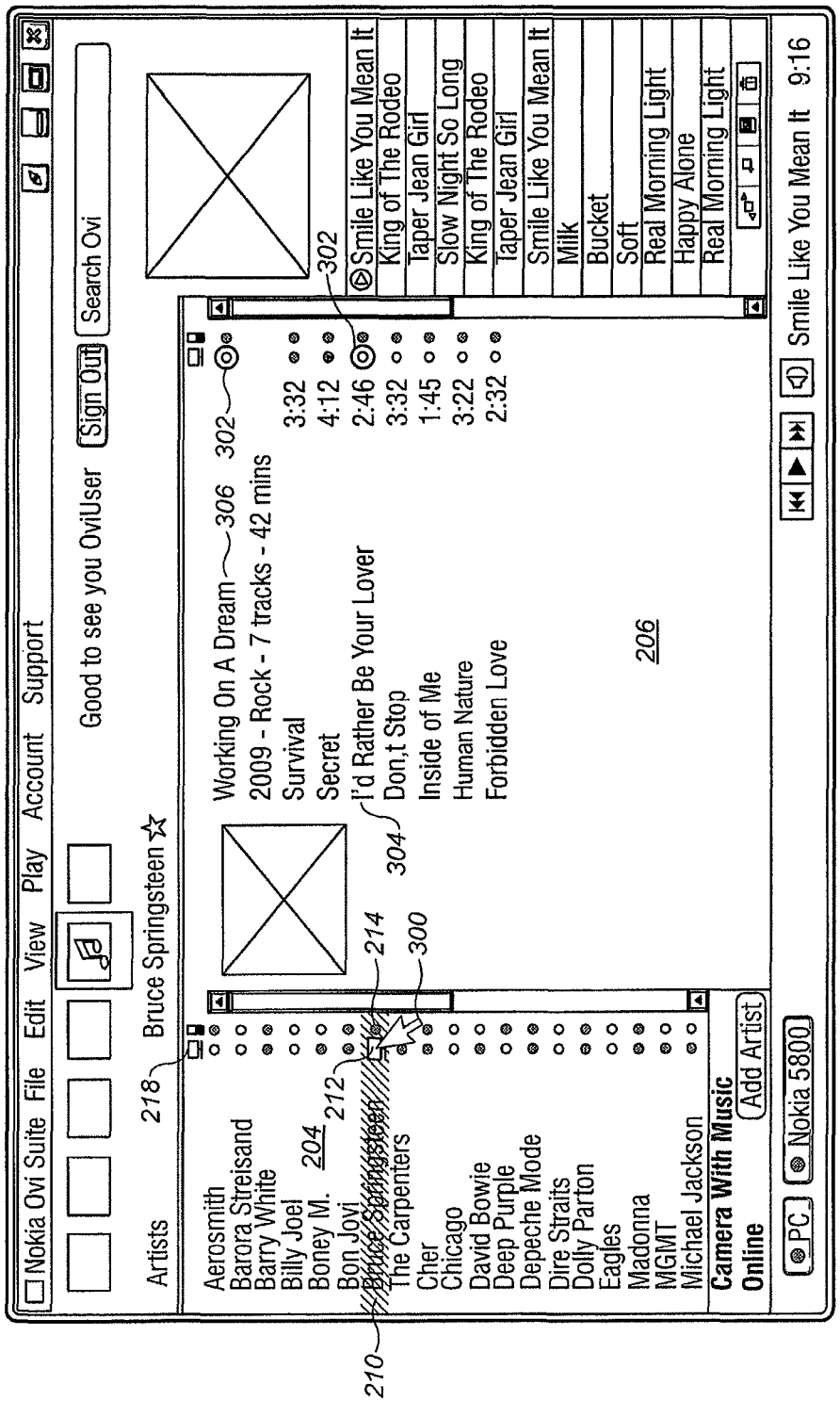

Referring now to FIG. 4, a third screenshot 200 provided by the user interface is shown. Here, another artist, "Bruce Springsteen", is shown selected. As can be seen from FIGS. 2 and 3 the first indicator 212 associated with this artist shows a negative status and the second indicator 214 associated with this artist shows a positive status. Thus content associated with this artist is stored in the mobile terminal memory 122, but not in the computer memory 108. The cursor 300 is shown positioned over the first indicator 212 associated with the selected artist. The first indicator 212 changes into the first memory symbol 216 when the cursor is positioned over it (e.g. when there is mouseover).

The central window area 206 shows an album title 306 and a list of tracks associated with this album. When a user selects the first indicator 212 in the left window area 204 while the first indicator shows a negative status, the content items associated with the artist are transferred into the computer memory 108. The first indicators 212 of the album 306 and the third track 304 are shown as transition state indicators 302, indicating that track 3 from that album is currently being transferred.

It should be noted that a content identifier does not need to be selected in order for its associated content indicators to change into memory symbols when the cursor 300 is positioned over them. Furthermore, an artist identifier does not need to be selected in order for the first or second indicators associated with that artist to be selected, and for a transfer or deletion of content to commence.

Figure 5:
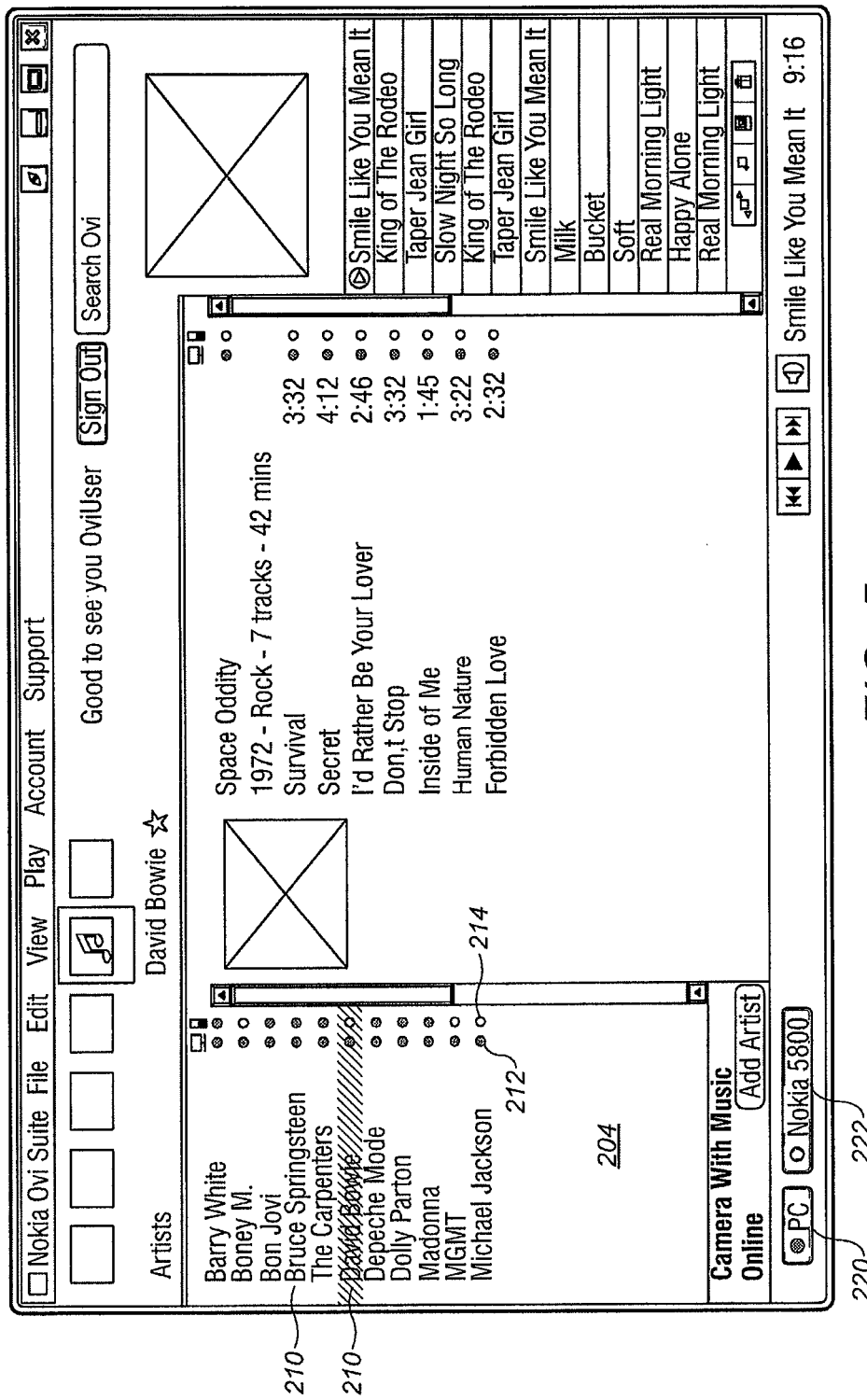

Referring now to FIG. 5, use of the first and second memory connection buttons 220, 222 is illustrated. The first memory connection button 220 shows a positive status indicating that content currently stored in the computer memory 108 is displayed. The second memory connection button 222 shows a negative status indicating that content stored only on the mobile terminal is not displayed. All of the content identifiers 210 shown in the left window area 204 have associated content which is stored within the computer memory 108. Some artists, for example "Bruce Springsteen", have content stored in both the computer memory 108 and the mobile terminal memory 122. Other artists, for example "David Bowie", have contents stored in the computer memory 108 but no content stored in the mobile terminal memory 122. An effect of this feature it that it allows a user to view, for example, all artists having associated content which is stored in the computer memory 108, and which can therefore be easily and quickly transferred to the mobile terminal memory 122 without the need for a download.

A user may select the first or second memory connection button 220, 222 to change the status of that button, and therefore change the content which is displayed. This may be achieved using the cursor 300 or via a key command. In the embodiment of FIG. 5, if only the PC memory connection button 220 has a positive status, then only content which is stored in the computer memory 108 is displayed. Therefore content which is available for streaming or download from a remote content provider 134 is not displayed since the computer memory 108 does not store that content. In one embodiment (not depicted), if both the first and second memory connection buttons 220, 222 have a negative status then only content which is available for access by the user, but not stored on either the computer or mobile terminal memory is displayed. For example, content which is available for streaming or download from a remote content provider 134 is displayed.

Figure 6:
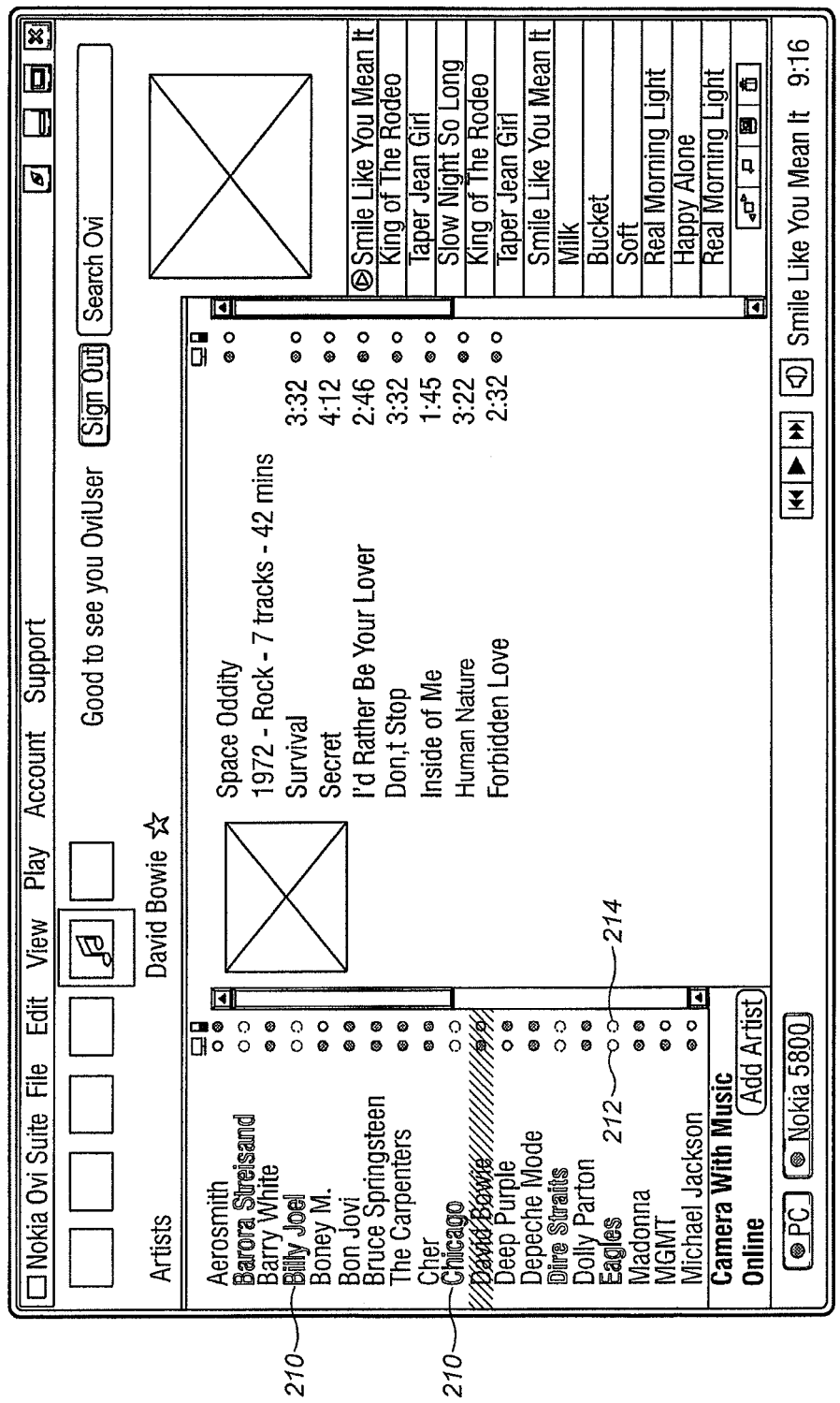

FIG. 6 illustrates a screenshot 200 provided by the user interface. This illustrates a scenario in which neither the computer nor the mobile terminal has access to a remote content provider 134, for instance because of the absence of an internet connection. Here, content which was previously available for access by the user from the remote content provider 134 is now unavailable. The content identifiers 210 associate with this previously available content are shown now as greyed out. The first and second indicators 212, 214 are also shown greyed out to indicate that this content is currently not available. In some embodiments a user may still select a greyed out content identifier 210 and view content which would be available if access to a remote storage memory 134 were available. In other embodiments the content identifiers 210 are not selectable. In this example, the first and second indicators 212, 214 are not selectable and do not change into the first or second memory symbol 216, 218 when the cursor 300 is positioned over them, e.g. by mouseover.

In other embodiments, the first and second indicators may show an intermediate state as well as a positive, negative or transition state. This intermediate state may indicate that some, but not all, of the content associated with that content identifier is stored in the respective memory. For example, where the content identifier is an artist identifier, the computer memory may store some albums by this artist, but not others. In this case the first indicator shows the intermediate state. An intermediate state indicator may take any suitable form, for example a half filled in circle or a circle of a different colour from the positive and negative states. For example, where the content identifier is an album identifier, the computer memory may store some tracks in the album, but not others. In this case the first indicator shows the intermediate state. The intermediate state indicator may take any suitable form, for example a half filled in circle or a circle of a different colour from the positive and negative states Selecting the intermediate indicator results in action. The actions may depend on a setting provided by the user. The actions may depend also or alternatively on another factor, for instance what it is that the content identifier relates to. If the content identifier is an album identifier, selection of the intermediate indicator may result in the album tracks that are not present in a memory being copied into that memory.

Figure 7:
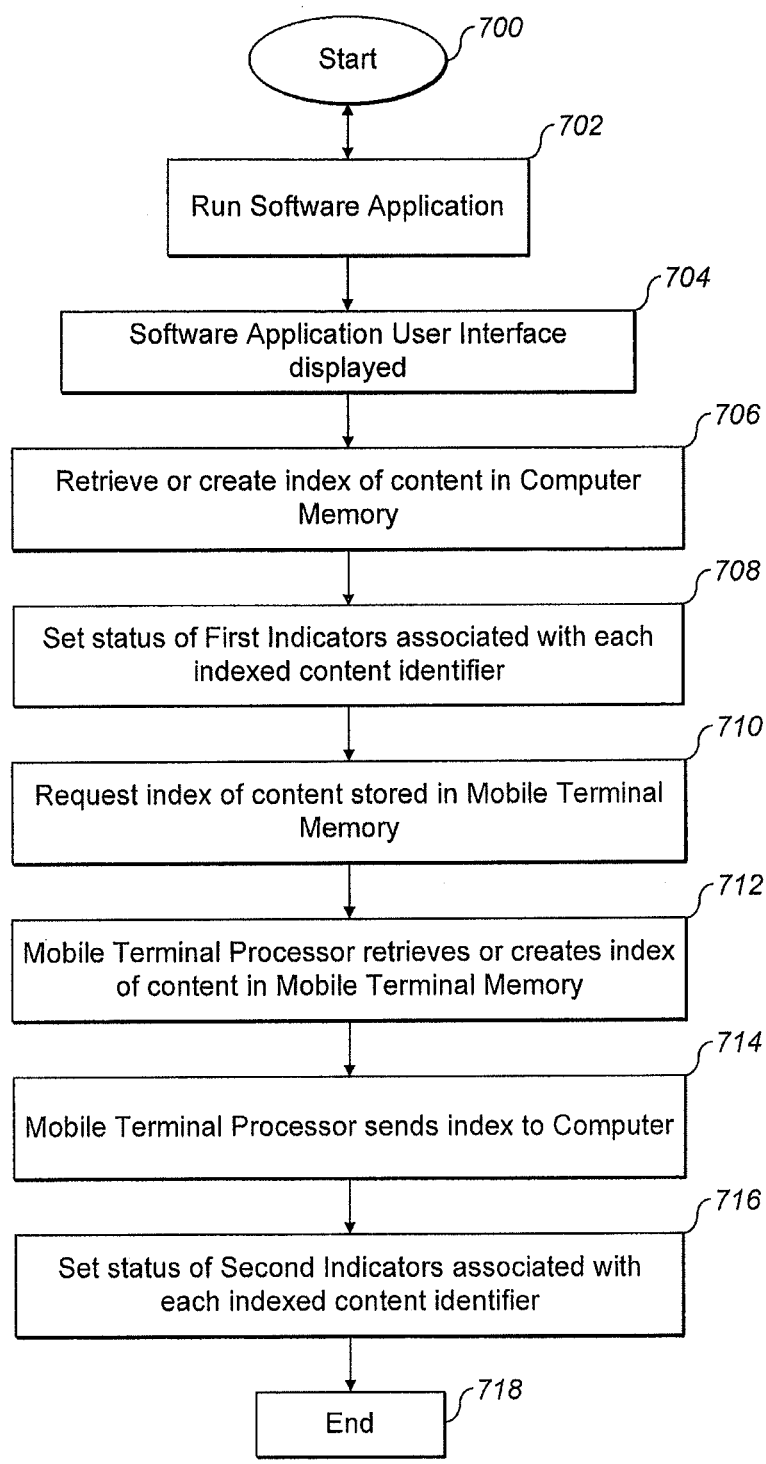
FIG. 7 is a flow chart illustrating initialisation of the status of first and second indicators forming part of the user interface.

FIG. 7 is a flow chart illustrating the steps which may be performed in initialising the status of the first and second indicators. The process begins at step 700. At step 702 the software application is started, executed or run. This step may occur in response to a specific user instruction to run the program or may occur automatically in response to some other input signal. Running the software application causes step 704, displaying one screenshot of the user interface, to occur. A screenshot of the user interface is displayed on display 109. Screenshots of the user interface are shown in FIGS. 2-6, however the user interface may comprise alternative and/or additional windows and options.

At step 706, the computer processor 106 obtains or creates an index or partial index of content stored in the computer memory 108. This step may be performed automatically in response to activation of the software application. For example the computer processor 106 may automatically create or retrieve from computer memory 108 a partial index relating to the selected content type. Thus if the 'music' content selection button 208 is selected, an index relating to audio files only would be created or retrieved.

Subsequent to the processor obtaining or creating the index of content, the processor sets the status of the first indicators associated with each content identifier according to the index at step 708. As described with reference to FIGS. 2 to 6, the first indicator 212 relates to the computer memory 108. The processor sets a positive status, indicated by a black or filled in circle, for each content item which is listed in the index as being stored in the computer memory 108. The processor sets a negative status, indicated by a white or unfilled circle, for each content item which is listed in the index as not being stored in the computer memory 108. This step may be performed in relation to all content stored in the computer memory, or only in relation to a selected content type.

At step 710 the computer processor 106 requests an index or partial index of content stored in the mobile terminal memory 122 from the mobile terminal 104. At any point after start 700, but before requests can be made of the mobile terminal, the mobile terminal is connected to the computer. The mobile terminal and computer may be connected using a wired connection, such as via link 130, and in some embodiments use a USB connection. In other embodiments the mobile terminal and computer may be connected in a wireless communications session via wireless network 132. In some embodiments the connection of the mobile terminal and computer may optionally cause the software application to run if it is not doing so already.

The request for a content index made in step 710 may be performed automatically in response to the mobile terminal being connected to the computer. In some embodiments only a partial index is requested, for example an index of content of a particular type, for instance audio files. In any case a request message is sent from the computer processor 106 to the mobile terminal processor 120. The received message may be interpreted by software running on the mobile terminal.

At step 712 the mobile terminal receives the content index request message and then obtains or creates an index or partial index of content stored in the mobile terminal memory 122 in response. The mobile terminal memory may have pre-indexed the content stored in the memory 122, for example an index may be maintained and updated whenever content is added to or deleted from the mobile terminal. In other embodiments, an index of content is not created until it is requested by the computer processor 106.

At step 714 the mobile terminal sends the content index to the computer via the same communication channel by which the content index request message was sent to the mobile terminal. At step 716 the computer receives the content index from the mobile terminal and the computer processor 106 sets the status of the second indicators associated with each content identifier according to the received index. As described with reference to FIGS. 2 to 6, the second indicator relates to the mobile terminal memory 122. The processor 106 sets a positive status, indicated by a black or filled in circle, for each content item which is listed in the received index as being stored in the mobile terminal memory 122. The processor sets a negative status, indicated by a white or unfilled circle, for each content item which is listed in the received index as not being stored in the mobile terminal memory 122.

It should be noted that step 710 may be performed after, before or in parallel with step 708. For example, once the index of content for the computer memory is obtained in step 706, the first indicators may be set in step 708 prior to the processor requesting an index from the mobile terminal in step 710. Alternatively, the first indicators may not be set until after the mobile terminal memory index has been obtained such that steps 708 (setting the first indicators) and 716 (setting the second indicators) may be performed together. In other embodiments the processor 106 may be capable of commencing the setting of the first indicators in step 708 and simultaneously commencing the request for the mobile terminal memory index in step 710.

Figure 8:
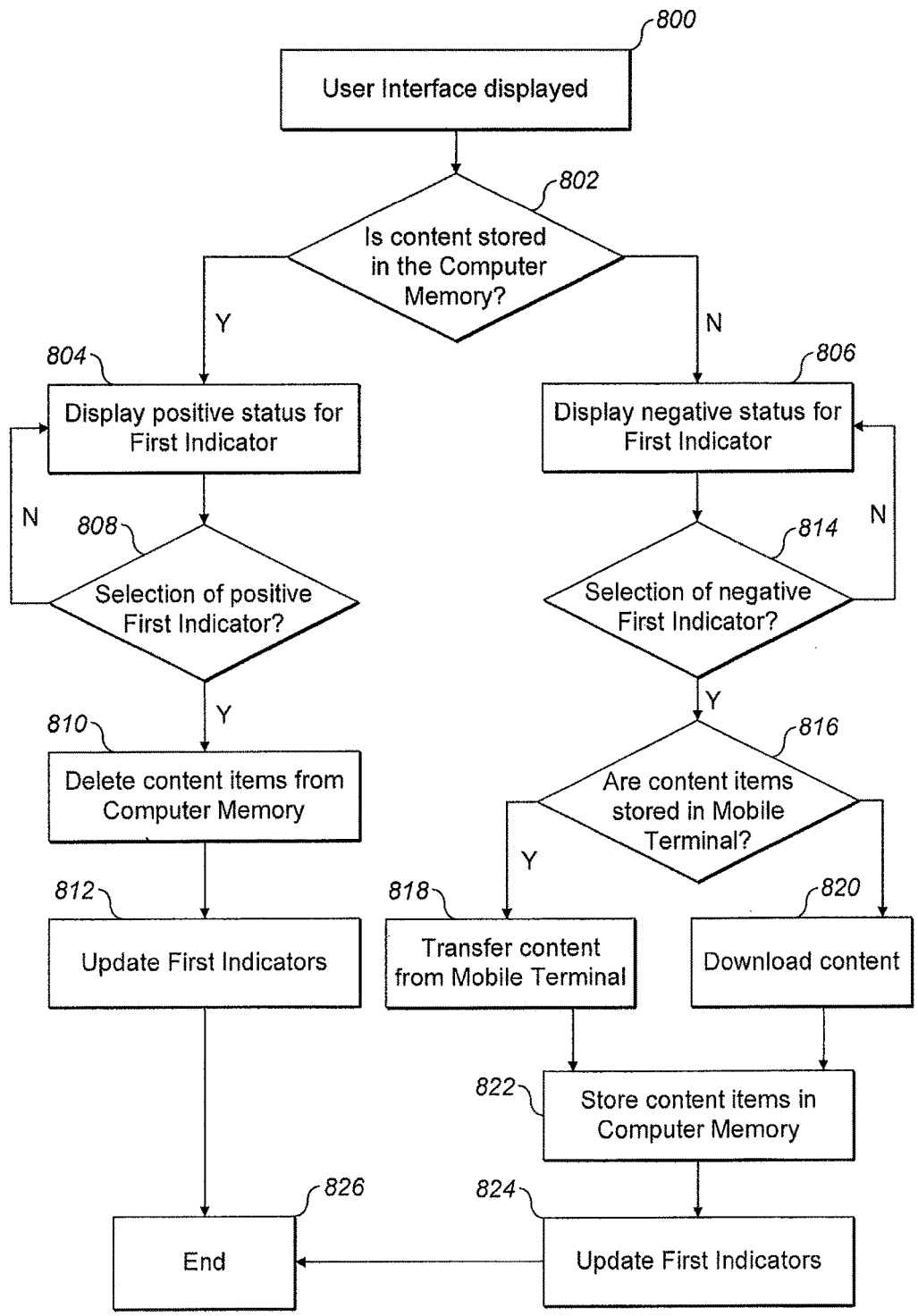
FIG. 8 is a flow chart illustrating updating of the status of the first indicator.

FIG. 8 is a flow chart illustrating updating of the status of the first indictor relating to the computer memory. The user interface 200 is being displayed at step 800. The display of the user interface includes displaying at least one content identifier 210 having a first and second indicator 212, 214 associated therewith.

At step 802 the processor 106, under control of the software application 110, checks if the content items associated with the displayed content identifiers are stored in the computer memory 108. This step is similar to steps 706 and 708 described with reference to FIG. 7, however only those content identifiers which are currently being displayed are checked against the index to see if their associated content items are stored in the computer memory.

If it is determined that content items associated with a displayed content identifier are stored in the computer memory then the first indicator 212 associated with that content identifier is controlled to display a positive state at step 804. If it is determined that content items associated with a displayed content identifier are not stored in the computer memory then the first indicator 212 associated with that content identifier is controlled to display a negative state at step 806. Step 802 is performed for each displayed content identifier such that all of the displayed first content identifiers display the correct status. For example, when the 'music' content selection button 208 is selected, the default display may be to list artists alphabetically in the left window area, to select the first artist in the list and display albums and tracks by that artist in the central window area.

At step 808 it is determined if one of the currently displayed positive state first indicators is selected. If no indicator is selected then the indicators remain unchanged and no content items are moved. If a positive state first indicator is selected at step 808 then the content items associated with the content identifier 210 to which the first indicator 212 belongs are deleted from the computer memory at step 810. While the content items are being deleted, the selected first indicator 212 may change into a transition state indicator 302. If content which is being deleted is currently displayed in the central window area 206, then the first indicators associated with those content items may also change into transition state indicators 302.

In some embodiments, selection of an indicator which is indicating a positive state only causes deletion of the associated content if the content identifier relates to a single content item, for example an individual music track. Here, positive state indicators associated with content identifiers which represent plural content items are unresponsive to selection. In this embodiment, accidental mass deletion of content is avoided. Alternatively, when a positive state indicator associated with a content identifier which represents plural content items is selected the user is prompted to confirm that they wish to delete all of the content items associated with that content identifier. In other embodiments, selection of an indicator which is indicating a positive state causes deletion of all of the associated content.

After the selected content items have been deleted from the computer memory in step 810, the first indicators associated with those content items are updated to have a negative status in step 812. This may involve updating the computer memory 108 index. If the user interface 200 is configured such that content which is not stored in the computer memory 108 should still be displayed, then the displayed first indicators are updated to show the negative status. Once the status of each first indicator has been updated the process ends at step 826.

At step 814 it is determined if one of the currently displayed negative state first indicators is selected. If no indicator is selected then the indicators remain unchanged and no content items are moved. If a negative state first indicator is selected at step 814 then it is determined that the content items associated with the content identifier 210 to which the first indicator 212 belongs should be transferred into the computer memory 108.

At step 816 it is determined if the content items which are to be transferred into the computer memory 108 are stored in the mobile terminal memory 122. This determination may be performed by computer processor 106 consulting the mobile terminal memory index or partial index. In reality the user may already be aware of whether the content items they wish to transfer into the computer memory are stored in the mobile terminal memory as they are able to see whether the second indicator 214 of the desired content identifier shows a positive or negative status.

If the selected content items are stored in the mobile terminal memory 122, then the content is transferred from the mobile terminal 104 to the computer 102 in step 818. As previously described this process may involve the computer processor 106 sending a transfer request to the mobile terminal processor 120, and the mobile terminal processor retrieving the content from the mobile terminal memory and sending it to the computer. Transferring the selected content from the mobile terminal to the computer has the advantage of typically being quicker than downloading that same content from an external source.

If the selected content items are not stored in the mobile terminal memory 122, then the content may be downloaded into the computer memory 108 in step 820. The procedure for downloading content has been previously described with reference to the Ovi™ store and may involve additional steps such as completing a log in procedure.

While the content items are being transferred or downloaded, the selected first indicator 212 may change into a transition state indicator 302. If content which is being transferred is currently displayed in the central window area 206, then the first indicators associated with those content items may also change into transition state indicators 302.

Once the selected content has been transferred or downloaded to the computer, it is stored in the computer memory 108 at step 822. After the selected content items have been stored in the computer memory in step 822, the first indicators associated with those content items are updated to have a positive status in step 824. This may involve updating the computer memory 108 index. If the user interface 200 is configured such that content which is stored in the computer memory 108 should still be displayed, then the displayed first indicators are updated to show the positive status. Once the status of each first indicator has been updated the process ends at step 826.

Figure 9:
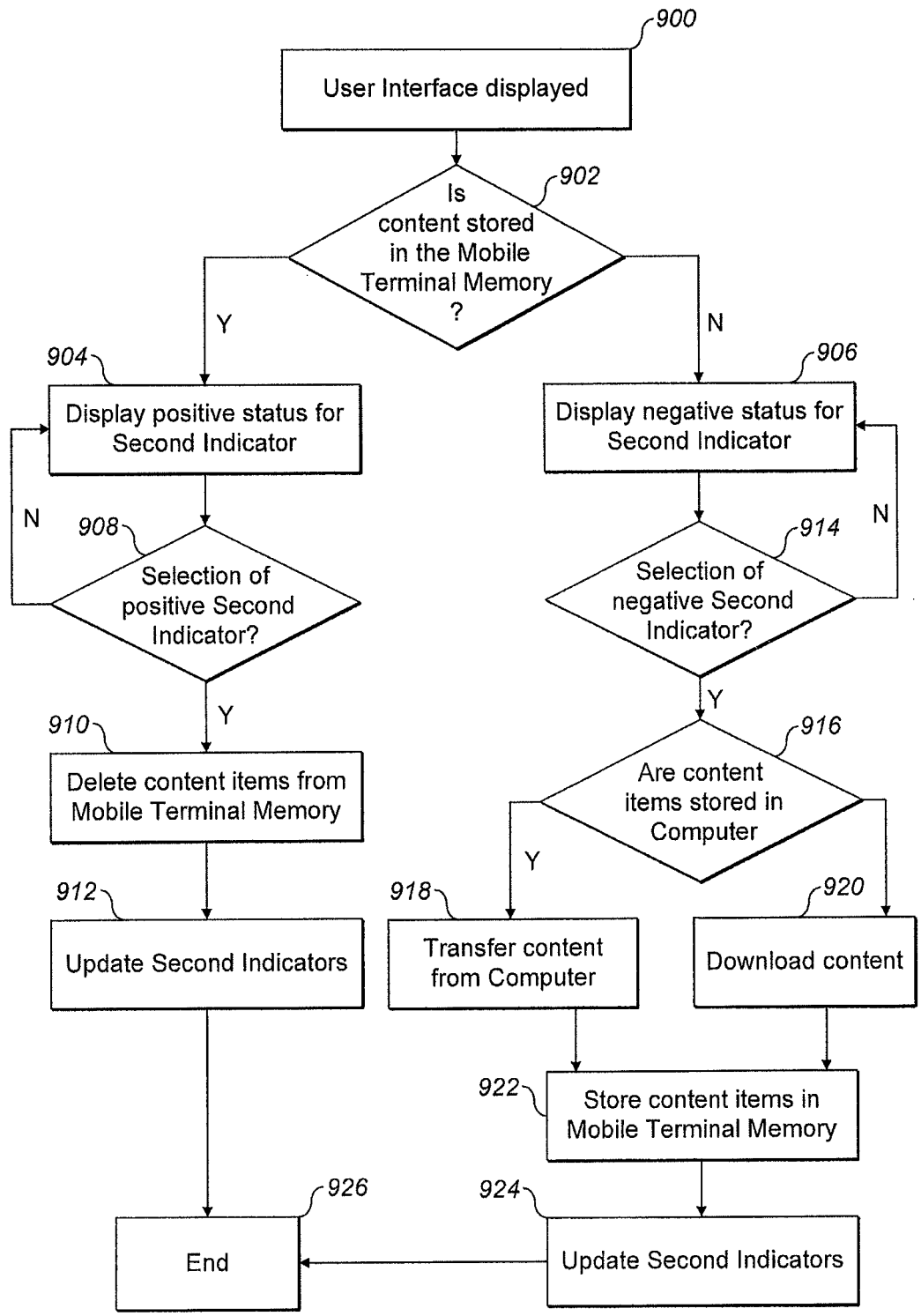
FIG. 9 is a flow chart illustrating updating of the status of the second indicator.

FIG. 9 is a flow chart illustrating updating of the status of the second indictor, relating to the mobile terminal memory. FIG. 9 has the same structure as FIG. 8. At step 900 the user interface 200 including at least one content identifier 210 having a first and second indicator 212, 214 associated therewith is displayed.

At step 902 the computer processor 106, under control of the software application 110, checks if the content items associated with the displayed content identifiers are stored in the mobile terminal memory 122. This check may be performed by computer processor 106 consulting the mobile terminal memory index or partial index. If it is determined that content items associated with a displayed content identifier are stored in the mobile terminal memory then the second indicator 214 associated with that content identifier is controlled to display a positive state at step 904. If it is determined that content items associated with a displayed content identifier are not stored in the mobile terminal memory then the second indicator 214 associated with that content identifier is controlled to display a negative state at step 906.

At step 908 it is determined if one of the currently displayed positive state second indicators is selected. If no indicator is selected then the indicators remain unchanged and no content items are moved. If a positive state second indicator is selected at step 908 then the content items associated with the content identifier 210 to which the second indicator 214 belongs are deleted from the mobile terminal memory at step 910. While the content items are being deleted, the selected second indicator 214 may change into a transition state indicator 302. If content which is being deleted is currently displayed in the central window area 206, then the second indicators associated with those content items may also change into transition state indicators 302.

After the selected content items have been deleted from the mobile terminal memory in step 910, the second indicators associated with those content items are updated to have a negative status in step 912. This may involve updating the mobile terminal memory 122 index. If the user interface 200 is configured such that content which is not stored in the mobile terminal memory 122 should still be displayed, then the displayed second indicators are updated to show the negative status. Once the status of each second indicator has been updated the process ends at step 926.

At step 914 it is determined if one of the currently displayed negative state second indicators is selected. If no indicator is selected then the indicators remain unchanged and no content items are moved. If a negative state second indicator is selected at step 914 then it is determined that the content items associated with the content identifier 210 to which the second indicator 214 belongs should be transferred into the mobile terminal memory.

At step 916 it is determined if the content items which are to be transferred into the mobile terminal memory 122 are stored in the computer memory 108. If the selected content items are stored in the computer memory 108, then the content is transferred from the computer to the mobile terminal in step 918. If the selected content items are not stored in the computer memory 108, then the content may be downloaded in step 920. The procedure for downloading content has been previously described with reference to the Ovi™ store and may involve additional steps such as completing a log in procedure. It will usually be more convenient and quicker for the computer 102 to download the desired content and then to transfer the downloaded content to the mobile terminal 104 rather than downloading the content directly to the mobile terminal.

While the content items are being transferred or downloaded, the selected second indicator 214 may change into a transition state indicator 302. If content which is being transferred is currently displayed in the central window area 206, then the second indicators associated with those content items may also change into transition state indicators 302.

Once the selected content has been transferred or downloaded to the mobile terminal, it is stored in the mobile terminal memory 122 at step 922. After the selected content items have been stored in the mobile terminal memory 122 in step 922, the second indicators associated with those content items are updated to have a positive status in step 924. This may involve updating the mobile terminal memory 122 index. If the user interface 200 is configured such that content which is stored in the mobile terminal memory 122 should still be displayed, then the displayed second indicators are updated to show the positive status. Once the status of each second indicator has been updated the process ends at step 926.

As well as showing a positive, negative and transition state, the first and second indicators 212, 214 may also show an error state. An error state indicator may have any suitable appearance and may be shown when, for example, a content transfer has not completed successfully or a file is corrupted.

It will be appreciated that the above described embodiments are purely illustrative and are not limiting on the scope of the invention. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the is prosecution of the present application or of any application derived therefrom, new claims may be formulated to cover any such features and/or combination of such features.

The invention claimed is:

1. An apparatus comprising at least one processor and at least one memory including computer program code, the at least one memory and the computer program code configured to, with the at least one processor, cause the apparatus to:
cause a content identifier associated with content to be displayed;
cause at least a first indicator and a second indicator to be displayed simultaneously and in association with the content identifier, the first indicator indicating whether or not the associated content is stored on a first memory, and the second indicator indicating whether or not the associated content is stored on a second memory, wherein the first memory and the second memory are comprised by separate user devices;
in response to a selection of the first indicator, and in an instance in which a) the first indicator indicates the associated content is not stored on the first memory and b) the second indicator indicates the associated content is stored on the second memory, cause the associated content to be copied from the second memory into the first memory;
in response to a selection of the second indicator, and in an instance in which a) the second indicator indicates the associated content is not stored on the second memory and b) the first indicator indicates the associated content is stored on the first memory, cause the associated content to be copied from the first memory into the second memory;
in an instance the associated content is available from at least one of the first memory or the second memory, enable access to the associated content via at least one of the separate user devices; and
in response to a selection of the content identifier, and in an instance in which the first and second indicators indicate the associated content is not stored on either of the separate user devices, enable access to the associated content via a source external to both of the separate user devices.

2. An apparatus according to claim 1, wherein the at least one memory and the computer program code are further configured to, with the at least one processor, to cause the apparatus to at least:
in response to completion of the copying, change a status of the first indicator to indicate that some or all of the associated content is stored in the first memory.

3. An apparatus according to claim 1, wherein the at least one memory and the computer program code are further configured to, with the at least one processor, to cause the apparatus to at least:
in response to a selection of the first indicator, and in an instance in which the first indicator indicates the associated content is stored on the first memory:
a) cause the associated content to be deleted from the first memory; and b) change a status of the first indicator to indicate that none of the associated content is stored on the first memory.

4. An apparatus according to claim 1, wherein the at least one memory and the computer program code are further configured to, with the at least one processor, to cause the apparatus to at least:
in response to a selection of the first indicator, and in an instance in which the first indicator indicates that none of the content is stored in the first memory and the second indicator indicates that none of the content is stored in the second memory:
a) cause the associated content to be downloaded into the first memory from an external source, other than the second memory; and
b) change a status of the first indicator to indicate that some or all of the content is stored in the first memory.

5. An apparatus according to claim 1, wherein the at least one memory and the computer program code are further configured to, with the at least one processor, to cause the apparatus to at least:
cause the first indicator to indicate a transition state when content is being copied into or deleted from the first memory; and
cause the first indicator not to be selectable while indicating the transition state.

6. An apparatus according to claim 1, wherein the at least one memory and the computer program code are further configured to, with the at least one processor, to cause the apparatus to at least:
in response to a selection of the first indicator, and in an instance in which: a) the content identifier relates to more than one content item, b) less than all of the more than one content items are stored in the second memory, and c) the first indicator indicates that none of the associated content is stored in the first memory, to cause copying of the content items that are stored in the second memory to the first memory.

7. An apparatus according to claim 1, wherein at least one memory and the computer program code are further configured to, with the at least one processor, to cause the apparatus to at least:
in an instance in which: a) the content identifier relates to more than one content item, and b) when less than all of the more than one content items are stored in the first or second memory, cause the respective first or second indicator to indicate an intermediate state.

8. A system comprising the apparatus of claim 1 and a mobile terminal, wherein the apparatus is a personal computing device such as a laptop or desktop computer and comprises the first memory, and wherein the mobile terminal comprises the second memory.

9. An apparatus according to claim 1, wherein the first memory is implemented on a first device, and the second memory is implemented on a second device, the second device being remote from the first device.

10. The apparatus according to claim 1, wherein the at least one memory and the computer program code are further configured to, with the at least one processor, cause the apparatus to at least:
in an instance a cursor is positioned over one of the first or second indicators, change the respective indicator over which the cursor is positioned to a symbol representing the respective first or second memory.

11. The apparatus according to claim 1, wherein the at least one memory and the computer program code are further configured to, with the at least one processor, cause the apparatus to at least:
cause display of first and second memory connection interface components, wherein each memory connection interface component reflects a status of whether content stored on the respective first and second memories is displayed, and enabling user configuration of whether content stored on the respective first and second memories is displayed.

12. The apparatus according to claim 1, wherein the at least one memory and the computer program code are further configured to, with the at least one processor, cause the apparatus to at least:
in an instance the associated content is not stored on the first memory and is not stored on the second memory, cause the appearance of the content identifier to differ from other content identifiers having associated content that is stored on at least the first memory or the second memory.

13. A computer program product comprising at least one non-transitory computer-readable storage medium having computer-executable program code instructions stored therein, the computer-executable program code instructions comprising program code instructions to:
cause a content identifier associated with content to be displayed;
cause at least a first indicator and a second indicator to be displayed simultaneously and in association with the content identifier, the first indicator indicating whether or not the associated content is stored on a first memory, and the second indicator indicating whether or not the associated content is stored on a second memory, wherein the first memory and the second memory are comprised by separate user devices;
in response to a selection of the first indicator, and in an instance in which a) the first indicator indicates the associated content is not stored on the first memory and b) the second indicator indicates the associated content is stored on the second memory, cause the associated content to be copied from the second memory into the first memory;
in response to a selection of the second indicator, and in an instance in which a) the second indicator indicates the associated content is not stored on the second memory and b) the first indicator indicates the associated content is stored on the first memory, cause the associated content to be copied from the first memory into the second memory;
in an instance the associated content is available from at least one of the first memory or the second memory, enable access to the associated content via at least one of the separate user devices; and
in response to a selection of the content identifier, and in an instance in which the first and second indicators indicate the associated content is not stored on either of the separate user devices, enable access to the associated content via a source external to both of the separate user devices.

14. A method comprising:
causing a content identifier associated with content to be displayed;
causing at least a first indicator and a second indicator to be displayed simultaneously and in association with the content identifier, the first indicator indicating whether or not the associated content is stored on a first memory, and the second indicator indicating whether or not the associated content is stored on a second memory, wherein the first memory and the second memory are comprised by separate user devices;
with a processor, in response to a selection of the first indicator, and in an instance in which a) the first indicator indicates the associated content is not stored on the first memory and b) the second indicator indicates the associated content is stored on the second memory, causing the associated content to be copied from the second memory into the first memory;
in response to a selection of the second indicator, and in an instance in which a) the second indicator indicates the associated content is not stored on the second memory and b) the first indicator indicates the associated content is stored on the first memory, causing the associated content to be copied from the first memory into the second memory;
in an instance the associated content is available from at least one of the first memory or the second memory, enabling access to the associated content via at least one of the separate user devices; and
in response to a selection of the content identifier, and in an instance in which the first and second indicators indicate the associated content is not stored on either of the separate user devices, enabling access to the associated content via a source external to both of the separate user devices.

15. A method according to claim 14, further comprising:
in response to completion of the copying, changing a status of the first indicator to indicate that some or all of the associated content is stored in the first memory.

16. A method according to claim 14, further comprising:
in response to a selection of the first indicator, and in an instance in which the first indicator indicates the associated content is stored on the first memory:
a) causing the associated content to be deleted from the first memory; and
b) changing a status of the first indicator to indicate that none of the associated content is stored in the first memory.

17. A method according to claim 14, further comprising:
in response to a selection of the first indicator, and in an instance in which the first indicator indicates that none of the content is stored in the first memory and the second indicator indicates that none of the content is stored in the second memory:
a) causing the associated content to be downloaded into the first memory from an external source, other than the second memory; and
b) changing a status of the first indicator to indicate that some or all of the content is stored in the first memory.

18. A method according to claim 14, further comprising:
causing the first indicator to indicate a transition state when content is being copied into or deleted from the first memory; and
causing the first indicator not to be selectable while indicating the transition state.

19. A method according to claim 14, further comprising:
in response to a selection of the first indicator, and in an instance in which:
a) the content identifier relates to more than one content item, b) less than all of the more than one content items are stored in the second memory, and c) the first indicator indicates that none of the associated content is stored in the first memory, causing copying of the content items that are stored in the second memory to the first memory.

20. A method according to claim 14, further comprising: in an instance in which: a) the content identifier relates to more than one content item, and b) less than all of the more than one content items are stored in the first or second memory, causing the respective first or second indicator to indicate an intermediate state.

* * * * *